(12) United States Patent
Zhou et al.

(10) Patent No.: US 11,127,088 B2
(45) Date of Patent: Sep. 21, 2021

(54) CROSS-BLOCKCHAIN INTERACTION METHOD, SYSTEM, COMPUTER DEVICE, AND STORAGE MEDIUM

(71) Applicant: ADVANCED NEW TECHNOLOGIES CO., LTD., Grand Cayman (KY)

(72) Inventors: Fan Zhou, Hangzhou (CN); Junguo Gao, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

(21) Appl. No.: 17/171,960

(22) Filed: Feb. 9, 2021

(65) Prior Publication Data

US 2021/0166328 A1    Jun. 3, 2021

Related U.S. Application Data

(63) Continuation of application No. PCT/CN2019/107437, filed on Sep. 24, 2019.

(30) Foreign Application Priority Data

Nov. 26, 2018 (CN) .......................... 201811419270.0

(51) Int. Cl.
  *G06Q 40/08* (2012.01)
  *G06Q 50/18* (2012.01)
  *G06F 16/23* (2019.01)

(52) U.S. Cl.
  CPC ......... *G06Q 40/08* (2013.01); *G06F 16/2379* (2019.01); *G06Q 50/18* (2013.01)

(58) Field of Classification Search
  CPC ......... G06Q 40/08; G06Q 50/18; G06F 16/23
  See application file for complete search history.

(56) References Cited

U.S. PATENT DOCUMENTS 7,539,700 B2 * 5/2009 Powell .................. G06F 21/606
7,694,128 B2    4/2010 Judge et al.
(Continued)

FOREIGN PATENT DOCUMENTS

CN    107018125 A    8/2017
CN    107948736 A    4/2018
(Continued)

OTHER PUBLICATIONS

First Search for Chinese Application No. 201811419270.0 dated Jan. 9, 2020.
(Continued)

*Primary Examiner* — Scott S Trotter (57) ABSTRACT

A cross-blockchain interaction system comprises: a service consortium chain, a judicial chain, a request client, and an evidence storage server. The request client obtains the processed case content after the case is processed, processes the processed case content to generate a digital abstract, and sends an evidence storage request to the evidence storage server, and the digital abstract is carried in the evidence storage request; the evidence storage server receives the evidence storage request, extracts the digital abstract and sends same to an evidence storage client; the evidence storage client corresponds to a blockchain node of the judicial chain, stores information on the judicial chain, receives the digital abstract, performs evidence storage and returns an evidence storage record ID; and the evidence storage server also returns the evidence storage record ID, the digital abstract, and the case content to an information storage node.

20 Claims, 7 Drawing Sheets

(56) References Cited

U.S. PATENT DOCUMENTS

| | | |
|---|---|---|
| 8,631,495 B2 | 1/2014 | Judge |
| 9,953,281 B2 | 4/2018 | Wiig et al. |
| 10,026,118 B2 | 7/2018 | Castinado et al. |
| 10,095,549 B1 | 10/2018 | Needham et al. |
| 10,095,992 B1 | 10/2018 | Brestoff et al. |
| 10,554,649 B1 * | 2/2020 | Fields .................. H04L 9/3263 |
| 10,872,381 B1 * | 12/2020 | Leise .................... G06F 16/183 |
| 2015/0310497 A1 | 10/2015 | Valin et al. |
| 2017/0243287 A1 | 8/2017 | Johnsrud et al. |
| 2017/0357966 A1 | 12/2017 | Chandrasekhar et al. |
| 2018/0096175 A1 | 4/2018 | Schmeling et al. |
| 2018/0139186 A1 | 5/2018 | Castagna |
| 2018/0150835 A1 | 5/2018 | Hunt et al. |
| 2018/0181768 A1 | 6/2018 | Leporini et al. |
| 2018/0285996 A1 | 10/2018 | Ma |
| 2018/0294966 A1 | 10/2018 | Hyun et al. |
| 2018/0307859 A1 | 10/2018 | Lafever et al. |
| 2019/0065709 A1 * | 2/2019 | Salomon ................ H04L 9/006 |
| 2019/0266145 A1 | 8/2019 | Qiu et al. |
| 2019/0303951 A1 * | 10/2019 | Bakalis ............. G06K 7/10722 |
| 2019/0342078 A1 | 11/2019 | Li |
| 2020/0020424 A1 * | 1/2020 | Lin ........................ G16H 10/60 |
| 2020/0127811 A1 * | 4/2020 | Sridhar ................ H04L 9/3239 |

FOREIGN PATENT DOCUMENTS

| | | |
|---|---|---|
| CN | 108389129 A | 8/2018 |
| CN | 108549825 A | 9/2018 |
| CN | 108665372 A | 10/2018 |
| CN | 108717431 A | 10/2018 |
| CN | 108809932 A | 11/2018 |
| WO | 2018183055 A1 | 10/2018 |

OTHER PUBLICATIONS

Supplementary Search for Chinese Application No. 201811419270.0 dated Mar. 21, 2020.

Written Opinion and International Search Report for PCT Application No. PCT/CN2019/107437 dated Nov. 27, 2020.

* cited by examiner

CROSS-BLOCKCHAIN INTERACTION METHOD, SYSTEM, COMPUTER DEVICE, AND STORAGE MEDIUM

CROSS REFERENCE TO RELATED APPLICATION

The present application is a continuation application of the International Patent Application No. PCT/CN2019/107437, filed on Sep. 24, 2019, and titled "CROSS-BLOCKCHAIN INTERACTION METHOD AND SYSTEM, COMPUTER DEVICE, AND STORAGE MEDIUM," which claims priority to Chinese Patent Application No. 201811419270.0 filed on Nov. 26, 2018. The entire contents of all of the above applications are incorporated herein by reference in their entirety.

TECHNICAL FIELD

This application relates to the field of blockchain technologies, and in particular, to a cross-blockchain interaction method and system, a computer device, and a storage medium.

BACKGROUND

Public credibility is a degree of social trust by the public. Nowadays, due to high-speed development of information, progresses of important events are spread by people using networks, which has replaced the public credibility of traditional media, and people's self-awareness and skepticism are also gradually improved, so that it is necessary to continuously improve the social public credibility to avoid occurrence of trust crises.

Using the insurance industry as an example, as a product, insurance has been accepted and used by increasingly more users. Generally, a user may purchase a plurality of types of insurances.

Currently, insurance claim settlement information of an insurer is generally stored and managed by the insurer, and then is uploaded to a query platform of the insurance industry after an insurance claim settlement case is finished. In addition, the uploaded insurance claim settlement information includes only an amount of insurance claim settlement and basic information of an insured subject matter. Subsequently, the insurer may reopen the case and modify the insurance claim settlement information. If a user suspects that the insurer modifies claim settlement information after a case is closed, there is no effective verification method currently available. According to this insurance claim settlement information management method, the insurance claim settlement information is not public, and even the insured person cannot freely know all detailed insurance records of himself/herself. In addition, since the insurer can modify the insurance claim settlement information subsequently, insurance fraud and a plurality of claims made for one case may occur. Vice versa. If the insurer intends to prove that the insurer did not modify data of a claim settlement case, it is necessary to purposefully have the data notarized in advance. An existing evidencing manner is mainly a manual process, such as notarization at the notary office, which lacks automatic processes, has low efficiency, high costs, and a long period, and cannot provide full privacy protection for materials and content involved in the case.

SUMMARY

In view of this, embodiments of this specification provide a cross-blockchain interaction method and system, a computer device, and a storage medium, to resolve technical defects in the existing technologies.

According to one aspect, the embodiments of this specification disclose a cross-blockchain interaction system, including: a service consortium chain, a judicial chain, a request client, and an evidence storage server.

The request client is configured to obtain, after a case is processed, content of the processed case, process the content of the processed case to generate a digital digest, and send an evidence storage request to the evidence storage server, where the evidence storage request carries the digital digest.

The evidence storage server is configured to receive the evidence storage request, extract the digital digest, and send the digital digest to an evidence storage client.

The evidence storage client corresponds to a blockchain node of the judicial chain and is configured to store information on the judicial chain, receive the digital digest, perform evidence storage of the digital digest, and return an evidence storage record ID.

The evidence storage server is further configured to obtain the evidence storage record ID returned by the judicial chain, and return the evidence storage record ID, the digital digest, and the content of the case to an information storage node.

The information storage node corresponds to a blockchain node of the insurance service consortium chain, and is configured to receive and store the evidence storage record ID, the digital digest, and the content of the case.

The evidence storage server is further configured to return the evidence storage record ID, the digital digest, and the content of the case to the request client.

The request client is further configured to: obtain information related to a case processed by a user, splice and integrate the information related to the case according to a preset rule of the request client, and process the integrated content of the case by using a digital digest algorithm to generate a digital digest.

The request client is further configured to: receive a check request of the user for a to-be-checked case and forward the check request to the evidence storage server.

The evidence storage server is further configured to: receive information about the to-be-checked case; generate a first digital digest based on the information about the to-be-checked case; input an evidence storage record ID of the to-be-checked case into an evidence query interface to obtain a second digital digest stored; and compare the first digital digest with the second digital digest, output a check result of the to-be-checked case, and feed back the result to the request client.

The request client is further configured to: receive and output the check result of the to-be-checked case.

According to another aspect, the embodiments of this specification disclose a cross-blockchain interaction method, including: receiving an evidence storage request, where the evidence storage request carries a digital digest generated by processing content of a processed case; extracting the digital digest, and sending the digital digest to an evidence storage client for evidence storage; and obtaining an evidence storage record ID returned by the evidence storage client, and returning the evidence storage record ID, the digital digest, and the content of the case to an information storage node.

According to another aspect, the embodiments of this specification disclose a cross-blockchain interaction method, including: receiving information about a to-be-checked case; generating a first digital digest based on the information about the to-be-checked case; inputting an evidence storage record ID of the to-be-checked case into an evidence query interface to obtain a second digital digest stored; and comparing the first digital digest with the second digital digest and outputting a comparison result.

According to another aspect, the embodiments of this specification disclose a cross-blockchain interaction method, including: processing, after a case is processed, content of the processed case to generate a digital digest; sending an evidence storage request to an evidence storage server, where the evidence storage request carries the digital digest; and receiving an evidence storage record ID, the digital digest, and the content of the case that are returned by the evidence storage server.

According to another aspect, the embodiments of this specification disclose a cross-blockchain interaction method, including: obtaining information related to a processed case; splicing and integrating the information related to the case according to a preset rule of a request client; and processing the integrated content of the case by using a digital digest algorithm to generate a digital digest.

According to another aspect, the embodiments of this specification disclose a cross-blockchain interaction apparatus, including: a first receiving module, configured to receive an evidence storage request, where the evidence storage request carries a digital digest generated by processing content of a processed case; an extraction module, configured to extract the digital digest, and send the digital digest to a judicial chain for evidence storage; a second receiving module, configured to obtain an evidence storage record ID returned by the judicial chain, and return the evidence storage record ID, the digital digest, and the content of the case to an information storage node; and a sending module, configured to return the evidence storage record ID, the digital digest, and the content of the case to a request client.

According to another aspect, the embodiments of this specification disclose a cross-blockchain interaction apparatus, including: a third receiving module, configured to receive information about a to-be-checked case; a generation module, configured to generate a first digital digest based on the information about the to-be-checked case; an obtaining module, configured to input an evidence storage record ID of the to-be-checked case into an evidence query interface to obtain a second digital digest stored; and a comparison module, configured to compare the first digital digest with the second digital digest, and send a check result of the to-be-checked case to a request client.

According to another aspect, the embodiments of this specification disclose a computer device, including a memory, a processor, and computer instructions stored in the memory and executable by the processor, where when the processor executes the instructions, steps of the cross-blockchain interaction method are implemented.

According to another aspect, the embodiments of this specification disclose a computer-readable storage medium, storing computer instructions, where when the instructions are executed by a processor, steps of the cross-blockchain interaction method are implemented.

This specification provides a cross-blockchain interaction method and system. A blockchain technology, also referred to as a distributed ledger technology, is an Internet database technology and features decentralization, openness, and transparency, thereby enabling all people to participate in database recording. Because the digital digest of the content of the processed case is stored on the judicial chain, and a mathematical principle of the digital digest algorithm ensures that the content of the processed case cannot be reversely generated from the digital digest, user privacy is protected. Transparent and tamper-resistant compensation information is implemented while user privacy is ensured, and a judicial effect is achieved for evidencing the compensation information.

DETAILED DESCRIPTION

In the following description, many specific details are described for thorough understanding of this specification. However, this specification may alternatively be implemented in other manners than those described herein, and a person skilled in the art may make similar modifications without departing from the content of this specification. Therefore, this specification is not limited to the embodiments disclosed below.

The terms used in one or more embodiments of this specification are merely used to describe the embodiments but are not intended to limit one or more embodiments of this specification. The terms "a," "the," and "said" in a singular form used in one or more embodiments of this specification and the appended claims are also intended to include a plural form, unless other meanings are clearly indicated in the context. It should further be understood that the term "and/or" used in one or more embodiments of this specification indicates and includes any or all possible combinations of one or more associated listed items.

Although the terms such as first and second may be used to describe various information in one or more embodiments of this specification, but such information should not be limited to these terms. These terms are merely used to distinguish between information of the same type. For example, without departing from the scope of one or more embodiments of this specification, the first may also be referred to as the second. Similarly, the second may also be referred to as the first. According to the context, the word "if" used herein may be interpreted as "during" or "when" or "in response to determining."

In this specification, a cross-blockchain interaction method and system, a computer device, and a storage medium are provided and are described in detail one by one in the following embodiments.

Figure 1:
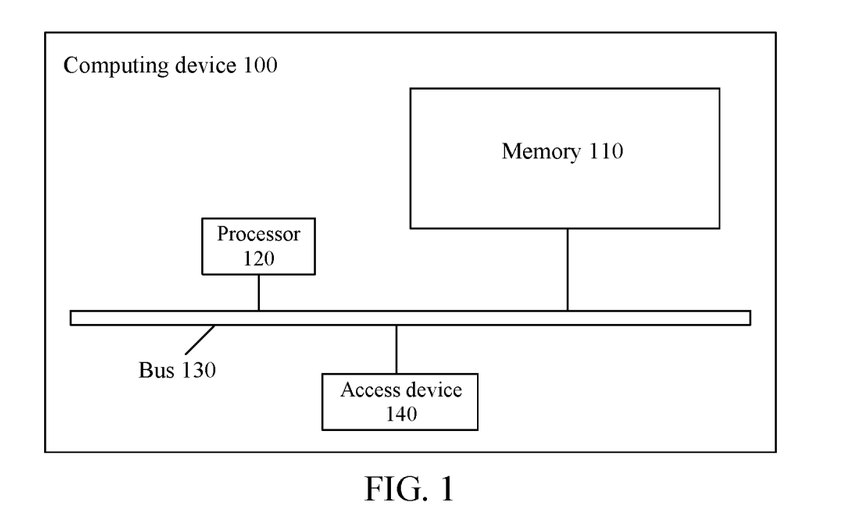
FIG. 1 is a schematic structural diagram of a computing device, according to an embodiment of this specification.

FIG. 1 shows a structural block diagram of a computing device 100 according to an embodiment of this application. Components of the computing device 100 include, but are not limited to, a memory 110 and a processor 120. The processor 120 and the memory 110 are connected through a bus 130.

The computing device 100 further includes an access device 140. The access device 140 may include one or more of wired or wireless network interfaces (for example, a network interface card (NIC)) of any types, such as an IEEE802.11 wireless local area network (WLAN) wireless interface, a worldwide interoperability for microwave access (Wi-MAX) interface, an Ethernet interface, a universal serial bus (USB) interface, a cellular network interface, a Bluetooth interface, a near field communication (NFC) interface, and the like.

In an embodiment of this specification, the foregoing components and other components not shown in FIG. 1 of the computing device 100 may be connected, for example, through the bus. The structural block diagram of the computing device shown in FIG. 1 is merely exemplary, and is not intended to limit the scope of this specification. A person skilled in the art may add or replace other components according to a requirement.

The computing device 100 may be a stationary or mobile computing device of any type, including a mobile computer, a mobile computing device (for example, a tablet computer, a person digital assistant, a laptop computer, a notebook, or a netbook), a mobile phone (for example, a smartphone), a wearable computing device (for example, a smartwatch or smart glasses), a mobile device of another type, or a stationary computing device such as a desktop computer or a personal computer (PC). The computing device 100 may alternatively be a mobile or stationary server.

Figure 2:
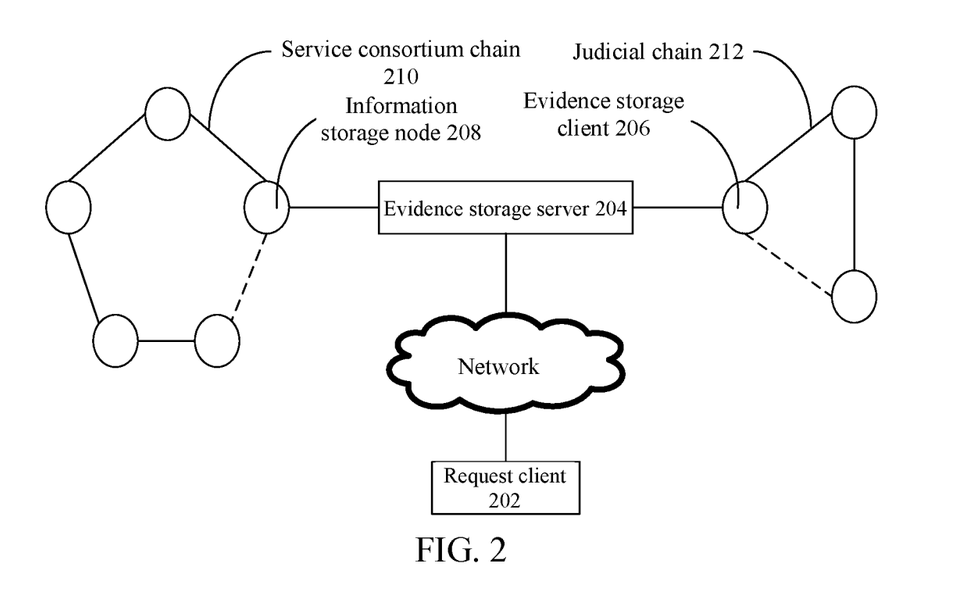
FIG. 2 is a schematic structural diagram of a cross-blockchain interaction system, according to an embodiment of this specification.

The processor 120 may perform steps in a system shown in FIG. 2. FIG. 2 is a schematic architectural diagram of a cross-blockchain interaction system, according to an embodiment of this specification. The cross-blockchain interaction system may include: a request client 202, an evidence storage server 204, an evidence storage client 206, an information storage node 208, a service consortium chain 210, and a judicial chain 212. The service consortium chain 210 is a blockchain for information storage in this specification, and the judicial chain 212 is a blockchain for information evidence storage in this specification.

The request client 202 is configured to obtain, after a case is processed, content of the processed case, process the content of the processed case to generate a digital digest, and send an evidence storage request to the evidence storage server, where the evidence storage request carries the digital digest.

The evidence storage server 204 is configured to receive the evidence storage request, extract the digital digest, and send the digital digest to the evidence storage client.

The evidence storage client 206 corresponds to a blockchain node of the judicial chain and is configured to store information on the judicial chain, receive the digital digest, perform evidence storage of the digital digest, and return an evidence storage record ID.

The evidence storage server 204 is further configured to obtain the evidence storage record ID returned by the judicial chain, and return the evidence storage record ID, the digital digest, and the content of the case to an information storage node.

The information storage node 208 corresponds to a blockchain node of the service consortium chain, and is configured to receive and store the evidence storage record ID, the digital digest, and the content of the case.

The evidence storage server 204 is further configured to return the evidence storage record ID, the digital digest, and the content of the case to the request client.

The request client 202 is further configured to: obtain information related to a case processed by a user, splice and integrate the information related to the case according to a preset rule of the request client, and process the integrated content of the case by using a digital digest algorithm to generate a digital digest.

The request client 202 is further configured to: receive a check request of the user for a to-be-checked case and forward the check request to the evidence storage server.

The evidence storage server 204 is further configured to: receive information about the to-be-checked case; generate a first digital digest based on the information about the to-be-checked case; input an evidence storage record ID of the to-be-checked case into an evidence query interface to obtain a second digital digest stored; and compare the first digital digest with the second digital digest, output a check result of the to-be-checked case, and feed back the result to the request client.

The request client 202 is further configured to: receive and output the check result of the to-be-checked case.

In one or more embodiments of this specification, the service consortium chain 210 includes a service-related institution device node, a service device node of an Internet platform, a device node of a regulator, and a service device node of the request client that access the blockchain.

Different services involve different institutions, so that service-related institution device nodes on different service consortium chains are also different. For example, service-related institution device nodes corresponding to a property insurance may include a maintenance factory and a third-party assessment institution, and service-related institution device nodes corresponding to a medical insurance may include a medical terminal device node and a service device node of a medical service institution. In some embodiments, the service-related institution device nodes need to be determined according to a specific situation of the insurance service, and this is not limited in this specification.

Description is made below by using the medical insurance as an example. With respect to a medical insurance service, a medical terminal device node has an information storage node 1 configured therein, a service device node of a medical service institution has an information storage node 2 configured therein, and a service device node of an Internet platform has an information storage node 3 configured therein. The information storage nodes 1 to 3 are not necessarily configured in blockchain nodes of an insurance service consortium chain, and may alternatively be configured in a standalone node other than the blockchain nodes.

A corresponding evidence storage client 206 is configured on the judicial chain 212. The evidence storage client may be configured in a blockchain node of the judicial chain, or may be configured in a standalone node outside the judicial chain, and this is not limited in this specification.

In one or more embodiments of this specification, the evidence storage server may be configured in a blockchain node of the judicial chain, which is equivalent to that the blockchain node is extended to have a cross-blockchain interaction function based on the related technologies. In another embodiment, the evidence storage server may be configured in a device, a node, a platform, or the like independent of the insurance service consortium chain and the judicial chain.

In one or more embodiments of this specification, members on the judicial chain include a court, a notary office, a judicial expertise center, and the like. The consortium chain is used for receiving evidence storage requests and performing credible endorsement that stored content has not been tampered with. The consortium chain may provide an evidence storage and notarization service with a judicial effect while meeting the national law and regulations. In addition, since distributed accounting and storage are used without centralized hardware or regulatory institutions, rights and duties of any nodes are equal. Once information is verified and added to the blockchain, the information is stored permanently, and it is futile to modify a database on a single node, so that the data stability and reliability of the blockchain is extremely high.

Figure 3:
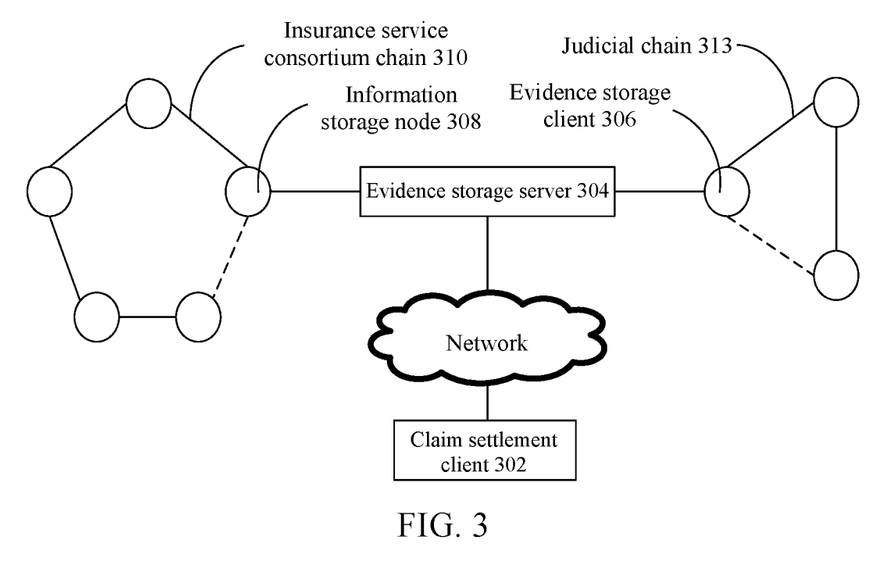
FIG. 3 is a schematic structural diagram of a cross-blockchain interaction system, according to an embodiment of this specification.

FIG. 3 is a schematic architectural diagram of a cross-blockchain interaction system, according to an embodiment of this specification. The system is applicable to the field of insurance services, and includes:

a claim settlement client 302, an evidence storage server 304, an evidence storage client 306, an information storage node 308, an insurance service consortium chain 310, and a judicial chain 313. The insurance service consortium chain 310 is a blockchain for information storage in this specification, and the judicial chain 313 is a blockchain for information evidence storage in this specification.

This embodiment is an application of the system shown in FIG. 2 to an insurance service. The service consortium chain 210 in FIG. 2 correspondingly becomes the insurance service consortium chain 310 in the insurance service. The request client 202 in FIG. 2 correspondingly becomes the claim settlement client 302 in the insurance service.

The claim settlement client 302 is configured to obtain, after claim settlement of a case is completed, content of the claim settlement case, process the content of the claim settlement case to generate a digital digest, and send an evidence storage request to the evidence storage server, where the evidence storage request carries the digital digest.

The evidence storage server 304 is configured to receive the evidence storage request, extract the digital digest, and send the digital digest to the evidence storage client.

The evidence storage client 306 corresponds to a blockchain node of the judicial chain and is configured to store information on the judicial chain, receive the digital digest, perform evidence storage of the digital digest, and return an evidence storage record ID.

The evidence storage server 304 is further configured to obtain the evidence storage record ID returned by the judicial chain, and return the evidence storage record ID, the digital digest, and the content of the case to the information storage node.

The information storage node 308 corresponds to a blockchain node of the service consortium chain, and is configured to receive and store the evidence storage record ID, the digital digest, and the content of the case.

The evidence storage server 304 is further configured to return the evidence storage record ID, the digital digest, and the content of the case to the claim settlement client.

The claim settlement client 302 is further configured to: obtain information related to a case with claim settlement completed by a user, splice and integrate the information related to the case according to a preset rule of the claim settlement client, and process the integrated content of the case by using a digital digest algorithm to generate a digital digest.

The claim settlement client 302 is further configured to: receive a check request of the user for a to-be-checked case and forward the check request to the evidence storage server.

The evidence storage server 304 is further configured to: receive information about the to-be-checked case; generate a first digital digest based on the information about the to-be-checked case; input an evidence storage record ID of the to-be-checked case into an evidence query interface to obtain a second digital digest stored; and compare the first digital digest with the second digital digest, output a check result of the to-be-checked case, and feed back the result to the claim settlement client.

The claim settlement client 302 is further configured to: receive and output the check result of the to-be-checked case.

In one or more embodiments of this specification, the insurance service consortium chain 310 includes a service-related institution device node, a service device node of an Internet platform, a device node of a regulator, and a service device node of an insurance claim settlement institution that access the blockchain.

Different insurance services involve different institutions, so that service-related institution device nodes on different insurance service consortium chains are also different. For example, service-related institution device nodes corresponding to a property insurance may include a maintenance factory and a third-party assessment institution, and service-related institution device nodes corresponding to a medical insurance may include a medical terminal device node and a service device node of a medical service institution. In some embodiments, the service-related institution device nodes need to be determined according to a specific situation of the insurance service, and this is not limited in this specification.

Description is made below by using the medical insurance as an example. With respect to a medical insurance service, a medical terminal device node has an information storage node 1 configured therein, a service device node of a medical service institution has an information storage node 2 configured therein, and a service device node of an Internet platform has an information storage node 3 configured therein. The information storage nodes 1 to 3 are not necessarily configured in blockchain nodes of the insurance service consortium chain, and may alternatively be configured in a standalone node other than the blockchain nodes.

A corresponding evidence storage client 306 is configured on the judicial chain 313. The evidence storage client may be configured in a blockchain node of the judicial chain, or may be configured in a standalone node outside the judicial chain, and this is not limited in this specification.

In one or more embodiments of this specification, the evidence storage server may be configured in a blockchain node of the judicial chain, which is equivalent to that the blockchain node is extended to have a cross-blockchain interaction function based on the related technologies; and in another embodiment, the evidence storage server may be configured in a device, a node, a platform, or the like independent of the insurance service consortium chain and the judicial chain.

In one or more embodiments of this specification, members on the judicial chain include a court, a notary office, a judicial expertise center, and the like. The consortium chain is used for receiving evidence storage requests and performing credible endorsement that stored content has not been tampered with. The consortium chain may provide an evidence storage and notarization service with a judicial effect while meeting the national law and regulations. In addition, since distributed accounting and storage are used without centralized hardware or regulatory institutions, rights and duties of any nodes are equal. Once information is verified and added to the blockchain, the information is stored permanently, and it is futile to modify a database on a single node, so that the data stability and reliability of the blockchain is extremely high.

Figure 4:
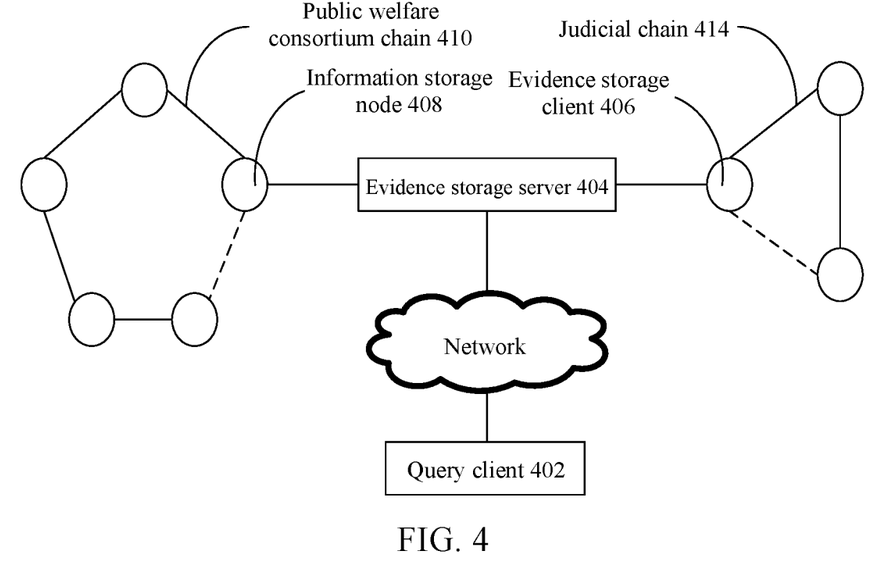
FIG. 4 is a schematic structural diagram of a cross-blockchain interaction system, according to an embodiment of this specification.

FIG. 4 is a schematic architectural diagram of a cross-blockchain interaction system, according to an embodiment of this specification. The system is applicable to the field of public welfare, and includes:

a query client 402, an evidence storage server 404, an evidence storage client 406, an information storage node 408, a public welfare consortium chain 410, and a judicial chain 414. The public welfare consortium chain 410 is a blockchain for information storage in this specification, and the judicial chain 414 is a blockchain for information evidence storage in this specification.

This embodiment is an application of the system shown in FIG. 2 to public welfare. The service consortium chain 210 in FIG. 2 correspondingly becomes the public welfare consortium chain 410 in public welfare. The request client 202 in FIG. 2 correspondingly becomes the query client 402 in public welfare.

The query client 402 is configured to obtain, after a public welfare activity, content of the public welfare activity, process the content of the public welfare activity to generate a digital digest, and send an evidence storage request to the evidence storage server, where the evidence storage request carries the digital digest.

In one or more embodiments of this specification, the public welfare activity may be caring donation, youth service, charity, a community activity, or a cultural and artistic activity, and education, social morality, poverty alleviation, and environmental protection all belong to the scope of public welfare.

The evidence storage server 404 is configured to receive the evidence storage request, extract the digital digest, and send the digital digest to the evidence storage client.

The evidence storage client 406 corresponds to a blockchain node of the judicial chain and is configured to store information on the judicial chain, receive the digital digest, perform evidence storage of the digital digest, and return an evidence storage record ID.

The evidence storage server 404 is further configured to obtain the evidence storage record ID returned by the judicial chain, and return the evidence storage record ID, the digital digest, and the content of the case to the information storage node.

The information storage node 408 corresponds to a blockchain node of the public welfare consortium chain, and is configured to receive and store the evidence storage record ID, the digital digest, and the content of the case.

The evidence storage server 404 is further configured to return the evidence storage record ID, the digital digest, and the content of the case to the query client.

The query client 402 is further configured to: obtain content of a public welfare activity, splice and integrate the content of the public welfare activity according to a preset rule of the query client, and process the integrated content by using a digital digest algorithm to generate a digital digest.

The query client 402 is further configured to: receive a check request of the user for a to-be-checked case and forward the check request to the evidence storage server.

The evidence storage server 404 is further configured to: receive information about the to-be-checked case; generate a first digital digest based on the information about the to-be-checked case; input an evidence storage record ID of the to-be-checked case into an evidence query interface to obtain a second digital digest stored; and compare the first digital digest with the second digital digest, output a check result of the to-be-checked case, and feed back the result to the query client.

The query client 402 is further configured to: receive and output the check result of the to-be-checked case.

In one or more embodiments of this specification, the public welfare consortium chain 410 includes a service-related institution device node, a service device node of an Internet platform, a device node of a regulator, and a service device node of a public welfare institution that access the blockchain.

In one or more embodiments of this specification, different public welfare involves different institutions, so that service-related institution device nodes on different public welfare consortium chains are also different. For example, service-related institution device nodes corresponding to a government public welfare service may include a government institution and a third-party assessment institution, and service-related institution device nodes corresponding to a government-run charity service may include a charity device node and a service device node of a third-party assessment institution. In some embodiments, the service-related institution device nodes need to be determined according to a specific situation of the public welfare service, and this is not limited in this specification.

Description is made below by using the government public welfare service as an example. With respect to a government public welfare service, a government institution terminal device node has an information storage node 1 configured therein, a service device node of a third-party assessment institution has an information storage node 2 configured therein, and a service device node of an Internet platform has an information storage node 3 configured therein. The information storage nodes 1 to 3 are not necessarily configured in blockchain nodes of the public welfare service consortium chain, and may alternatively are configured in a standalone node other than the blockchain nodes.

A corresponding evidence storage client 406 is configured on the judicial chain 414. The evidence storage client may be configured in a blockchain node of the judicial chain, or may be configured in a standalone node outside the judicial chain, and this is not limited in this specification.

In one or more embodiments of this specification, the evidence storage server may be configured in a blockchain node of the judicial chain, which is equivalent to that the blockchain node is extended to have a cross-blockchain interaction function based on the related technologies; and in another embodiment, the evidence storage server may be configured in a device, a node, a platform, or the like independent of the insurance service consortium chain and the judicial chain.

In one or more embodiments of this specification, members on the judicial chain include a court, a notary office, a judicial expertise center, and the like. The consortium chain is used for receiving evidence storage requests and performing credible endorsement that stored content has not been tampered with. The consortium chain may provide an evidence storage and notarization service with a judicial effect while meeting the national law and regulations. In addition, since distributed accounting and storage are used without centralized hardware or regulatory institutions, rights and duties of any nodes are equal. Once information is verified and added to the blockchain, the information is stored permanently, and it is futile to modify a database on a single node, so that the data stability and reliability of the blockchain is extremely high.

Figure 5:
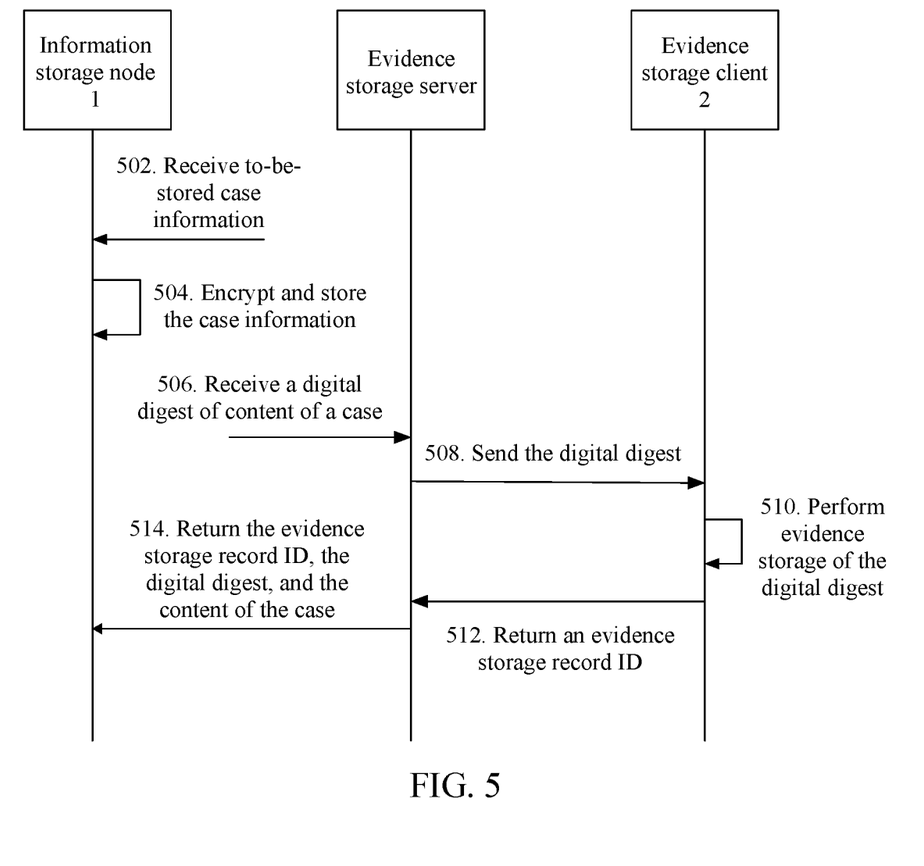
FIG. 5 is an interaction diagram of a cross-blockchain interaction system, according to an embodiment of this specification.

The following describes an interaction process of a cross-blockchain interaction system according to this specification by using the insurance industry as an example. In this embodiment, the process of the cross-blockchain interaction system is described by using a blockchain node, that is, an information storage node 1, of an insurance service consortium chain and a blockchain node, that is, an evidence storage client 2, of a judicial chain with reference to FIG. 5. The process is applicable between the insurance service consortium chain, an evidence storage server, and the judicial chain. As shown in FIG. 5, the information interaction process may include steps 502 to 514.

Step 502. The information storage node 1 receives to-be-stored claim settlement information.

In one or more embodiments of this specification, a claim settlement client sends an information storage request to the information storage node 1, where the information storage request carries the to-be-stored information.

Step 504. The information storage node encrypts and stores the claim settlement information.

In one or more embodiments of this specification, encryption and storage of the claim settlement information are implemented jointly by a plurality of nodes distributed at different places, and each node records complete information. The nodes may participate in supervision of transaction validity and also jointly attest to the transaction validity.

Step 506. The evidence storage server receives a digital digest of content of a case.

In one or more embodiments of this specification, after the claim settlement client completes claim settlement for a user, the evidence storage server obtains information related to the claim settlement case, which includes insurance policy information, user information, and service-related information of the claim settlement case; splices and integrates the information related to the case according to a preset rule of the claim settlement client; and processes the integrated content of the case by using a digital digest algorithm to generate the digital digest.

Different insurance services require different types of claim settlement materials. For example, a property insurance generally requires a survey report, a detailed list of maintenance, photos of an accident scene, and photos of a lost subject matter; and a health insurance generally requires an audit conclusion, diagnosis and treatment information, an inspection report, a claim settlement record, and a diagnosis and treatment report. In some embodiments, the claim settlement materials need to be determined according to a type of the claim settlement case, and this is not limited in this specification.

In one or more embodiments of this specification, the digital digest algorithm may be any one of algorithms such as SHA256, SM, and/or MD5.

Step 508. The evidence storage server sends the digital digest of the content of the case.

In one or more embodiments of this specification, the evidence storage server receives the digital digest sent by the claim settlement client and sends the digital digest to the evidence storage client.

Step 510. The evidence storage client 2 performs evidence storage of the digital digest.

Step 512. The evidence storage client 2 returns an evidence storage record ID.

Step 514. The evidence storage server returns the evidence storage record ID, the digital digest, and the content of the case.

In one or more embodiments of this specification, the evidence storage server may be configured in a blockchain node of the judicial chain, which is equivalent to that the blockchain node is extended to have a cross-blockchain interaction function based on the related technologies; and in another embodiment, the evidence storage server may be configured in a device, a node, a platform, or the like independent of the insurance service consortium chain and the judicial chain.

In one or more embodiments of this specification, different from a conventional centralized information storage manner, no node can store information alone, and no node can perform evidence storage of the digital digest alone, thereby preventing the possibility of false accounting due to centralized information storage. In addition, because there are plenty of nodes, theoretically, unless all the nodes are destroyed, information will not be lost, thereby ensuring information security.

Figure 6:
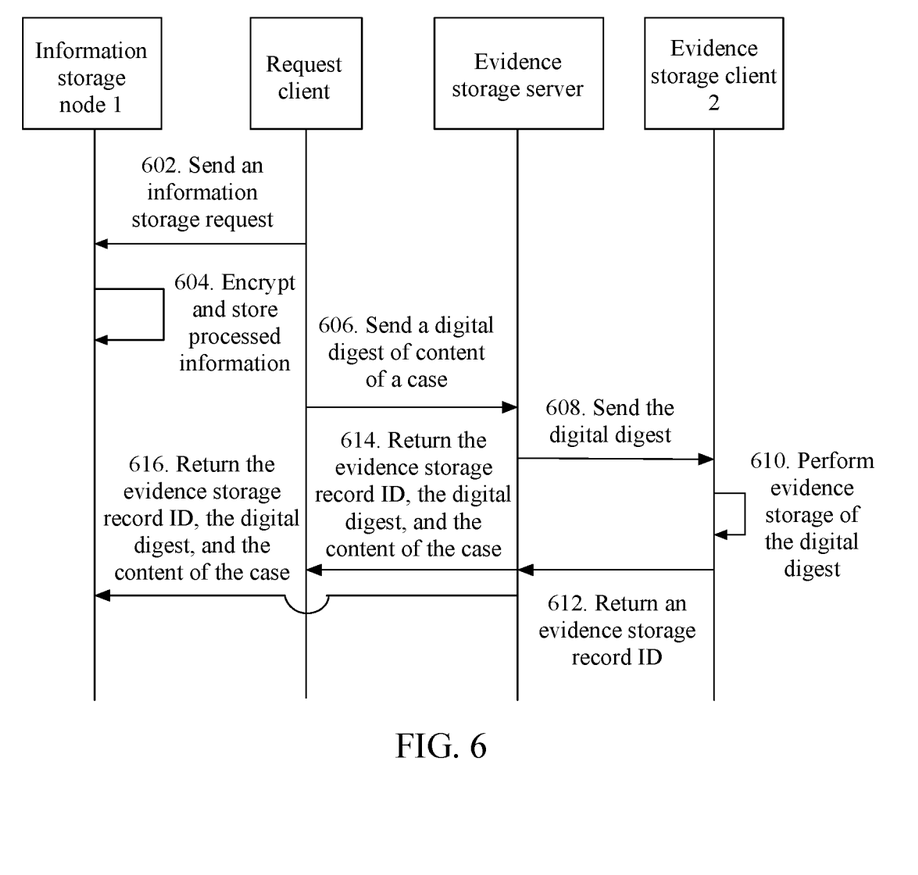
FIG. 6 is an interaction diagram of a cross-blockchain interaction system, according to an embodiment of this specification.

FIG. 6 is a schematic interaction diagram of a cross-blockchain interaction system, according to an embodiment of this specification. Description is made by still using an application of the system to the insurance industry as an example. The system is applicable between an insurance service consortium chain, a claim settlement client, an evidence storage server, and a judicial chain. In this embodiment, description is made by using a blockchain node, that is, an information storage node 1, of the insurance service consortium chain and a blockchain node, that is, an evidence storage client 2, of the judicial chain as an example, and steps 602 to 616 are included.

Step 602. The claim settlement client sends an information storage request.

In one or more embodiments of this specification, the claim settlement client sends an information storage request to the information storage node 1, where the information storage request carries to-be-stored information.

Step 604. The information storage node encrypts and stores the claim settlement information.

In one or more embodiments of this specification, encryption and storage of the claim settlement information are implemented jointly by a plurality of nodes distributed at different places, and each node records complete information. The nodes may participate in supervision of transaction validity and also jointly attest to the transaction validity.

Step 606. The claim settlement client sends a digital digest of content of a case.

In one or more embodiments of this specification, after the claim settlement client completes claim settlement for a user, the claim settlement client sends information related to the claim settlement case to the evidence storage server, which includes insurance policy information, user information, and service-related information of the claim settlement case; splices and integrates the information related to the case according to a preset rule of the claim settlement client;

and processes integrated content of the case by using a digital digest algorithm to generate the digital digest.

In one or more embodiments of this specification, the digital digest algorithm may be any one of algorithms such as SHA256, SM, and/or MD5.

Step 608. The evidence storage server sends the digital digest of the content of the case.

In one or more embodiments of this specification, the evidence storage server receives the digital digest sent by the claim settlement client and sends the digital digest to the evidence storage client.

Step 610. The evidence storage client 2 performs evidence storage of the digital digest.

Step 612. The evidence storage client 2 returns an evidence storage record ID.

Step 614. The evidence storage server returns the evidence storage record ID, the digital digest, and the content of the case to the claim settlement client.

In one or more embodiments of this specification, the evidence storage server returns the evidence storage record ID, the digital digest, and the content of the case to the claim settlement client as a basis of future verification, and then the claim settlement client sends the evidence storage record ID, the digital digest, and the content of the case to the user. In future, if the user intends to verify whether the content of the claim settlement case is modified, the user may invoke the same digital digest algorithm to process the content of the claim settlement case to generate a digital digest, and verify the claim settlement information of the case on the judicial chain based on the evidence storage record ID and the newly generated digital digest.

Step 616. The evidence storage server returns the evidence storage record ID, the digital digest, and the content of the case to the information storage node.

In one or more embodiments of this specification, different from a conventional centralized information storage manner, no node can store information alone, and no node can perform evidence storage of the digital digest alone, thereby preventing the possibility of false accounting due to centralized information storage. In addition, once information is verified and added to the blockchain, the information is stored permanently, and it is futile to modify a database on a single node, so that the data stability and reliability of the blockchain is extremely high.

In one or more embodiments of this specification, the information storage node corresponds to a blockchain node of the insurance service consortium chain.

In one or more embodiments of this specification, each device node of the insurance service consortium chain has an information storage node configured therein, and the claim settlement information written into any information storage node of the insurance service consortium chain is automatically synchronized to all other information storage nodes. The information is stored jointly by a plurality of nodes distributed at different places, thereby representing a decentralization feature of blockchain nodes. In addition, each node records complete information, so that all the nodes may participate in supervision of transaction validity and also jointly attest to the transaction validity.

Figure 7:
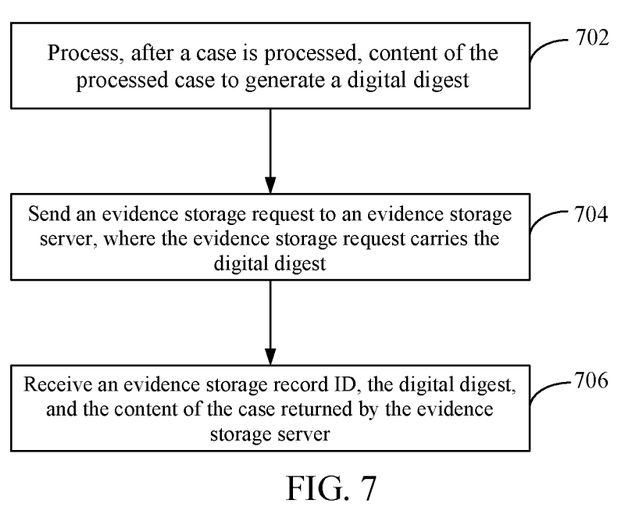
FIG. 7 is a flowchart of a cross-blockchain interaction method, according to an embodiment of this specification.

FIG. 7 is a flowchart of a cross-blockchain interaction method, according to an embodiment of this specification. The interaction method is applicable to a request client and includes steps 702 to 706.

Step 702. Processing content of a processed case to generate a digital digest.

In one or more embodiments of this specification, the content of the processed case includes: content of a claim settlement case with claim settlement completed or content of a finished public welfare activity.

Figure 8:
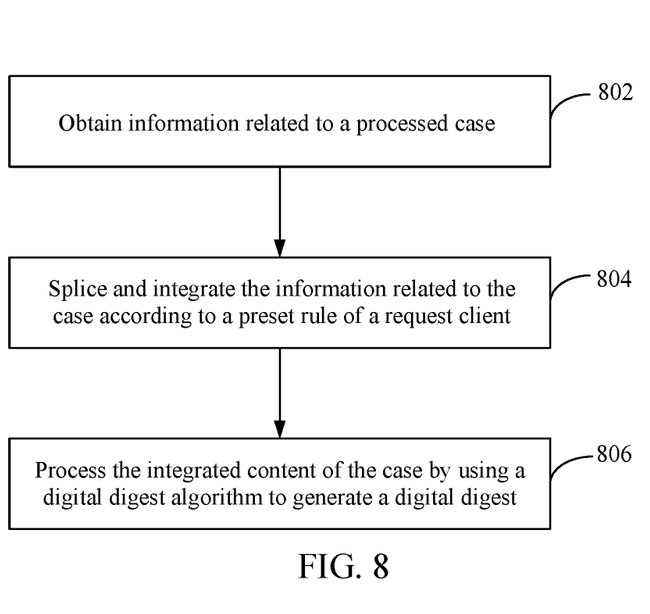
FIG. 8 is a flowchart of a cross-blockchain interaction method, according to an embodiment of this specification.

In one or more embodiments of this specification, step 702 may be implemented through steps shown in FIG. 8, including steps 802 to 806.

Step 802. Obtaining information related to the processed case.

The information about the processed case includes user information and service-related information of the processed case.

In one or more embodiments of this specification, specific content of the case service-related information is determined according to a specific type of the case.

A specific form of the service-related information may include:

1) Word processing file: a file formed through a word processing system, which includes words, punctuations, tables, symbols, and other encoded text. Files generated by different types of word processing software (for example, Word and WPS) are incompatible with each other, and files formed by using different code rules cannot be directly read. All these software, systems, code, and text content together form basic elements of the word processing file.

2) Graphic processing file: graphic data designed or manufactured under the assistance of a dedicated software system of a computer. People may intuitively know a relationship between discontinuous data through the graphics, so that complex information becomes vivid and clear.

3) Database file: a file including a plurality of original data records. Functions of a database system is inputting and storing data, querying for records, and outputting results according to instructions, which has very high information value. However, only after sorting and summarization, the database system can have practical use and value.

4) Program file: a tool used by a computer for human-machine communication, where software includes a plurality of program files.

5) Video, audio, or image file: a "multi-media" file generally spoken, which is generally formed through comprehensive editing such as scanning and identification, video capturing, and audio recording. That is, an evidence storage file may be a text file, a video file, an image file, and/or a sound file.

Step 804. Splicing and integrating the information related to the case according to a preset rule of the request client.

Step 806. Processing the integrated content of the case by using a digital digest algorithm to generate a digital digest.

In one or more embodiments of this specification, after processing a case of a user, the request client obtains information related to the processed case; and splices and integrates the information related to the case according to a preset rule of the request client; and processes the integrated content of the case by using a digital digest algorithm to generate a digital digest.

In one or more embodiments of this specification, the digital digest algorithm may be any one of algorithms such as SHA256, SM, and/or MD5.

Step 704. Sending an evidence storage request to an evidence storage server, where the evidence storage request carries the digital digest.

Step 706. Receiving an evidence storage record ID, the digital digest, and the content of the case that are returned by the evidence storage server.

In one or more embodiments of this specification, the evidence storage server returns the evidence storage record ID, the digital digest, and the content of the case to the request client as a basis of future verification, and then the request client sends the evidence storage record ID, the digital digest, and the content of the case to the user. In future, if the user intends to verify whether the information of the processed case is modified, the user may invoke the same digital digest algorithm to process the content of the case to generate a digital digest, and verify the case information on the judicial chain based on the evidence storage record ID and the newly generated digital digest.

Figure 9:
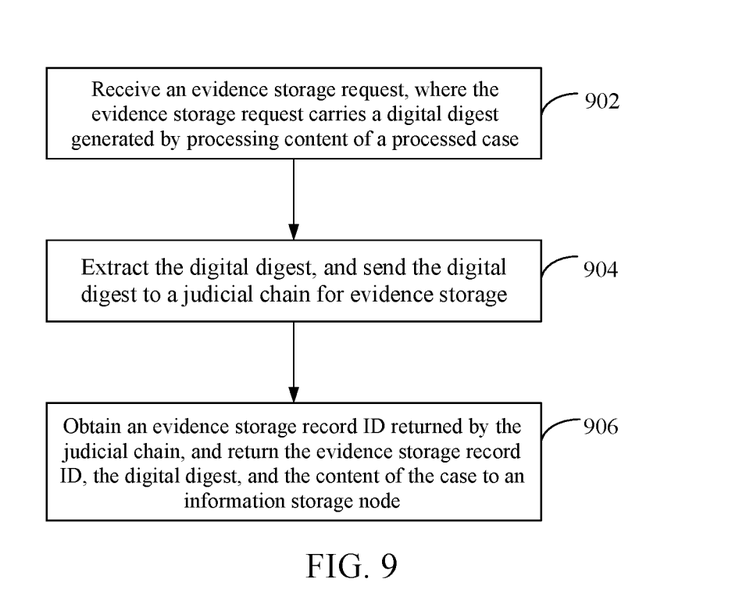
FIG. 9 is a flowchart of a cross-blockchain interaction method, according to an embodiment of this specification.

FIG. 9 is a flowchart of a cross-blockchain interaction method, according to an embodiment of this specification. The interaction method is applicable to an evidence storage server and includes steps 902 to 906.

Step 902. Receiving an evidence storage request, where the evidence storage request carries a digital digest generated by processing content of a processed case.

In some embodiments, the content of the processed case includes content of a claim settlement case with claim settlement completed or content of a finished public welfare activity.

Step 904. Extracting the digital digest, and sending the digital digest to an evidence storage client for evidence storage.

In one or more embodiments of this specification, the evidence storage client corresponds to a judicial chain.

The evidence storage client receives the digital digest and generates an evidence storage record ID according to an encryption algorithm. Each device node of the judicial chain has an evidence storage client configured therein, and the digital digest written into any evidence storage client in the judicial chain will be automatically synchronized to all other evidence storage clients, so that all the evidence storage clients may participate in supervision of transaction validity and also jointly attest to the transaction validity.

Step 906. Obtaining an evidence storage record ID returned by the evidence storage client, and returning the evidence storage record ID, the digital digest, and the content of the case to an information storage node.

In one or more embodiments of this specification, when the evidence storage server transmits information to the information storage node and the evidence storage client, the information transmission may be implemented by invoking an API thereof, and before the API is invoked, permission verification needs to be performed according to a service contract of the judicial chain. The API is shown in the following table:

| Input parameter | | | |
| --- | --- | --- | --- |
| bizNo | Service document number | Character string | Used for idempotent control |
| content | Stored content | Character string | |
| Output parameter | | | |
| returnCode | Status code | Character string | Code representing an operation completed state |
| recordID | ID of record stored on sevice consortium chain | Character string | |
| blockHeight | Block height | Numeric | |

As shown in the table, after the request client sends related information such as content of a case and a service document number to the blockchain, the blockchain node performs encryption and storage, that is, evidence storage, by using an algorithm, and then the related information is stored or outputted in the form of a character string.

In one or more embodiments of this specification, the blockchain uses symmetric encryption and authorization technologies. Information stored on the blockchain is public, but user identity information is strongly encrypted and can be accessed only with authorization of a data owner, thereby ensuring information security and also preventing personal privacy from being leaked.

Figure 10:
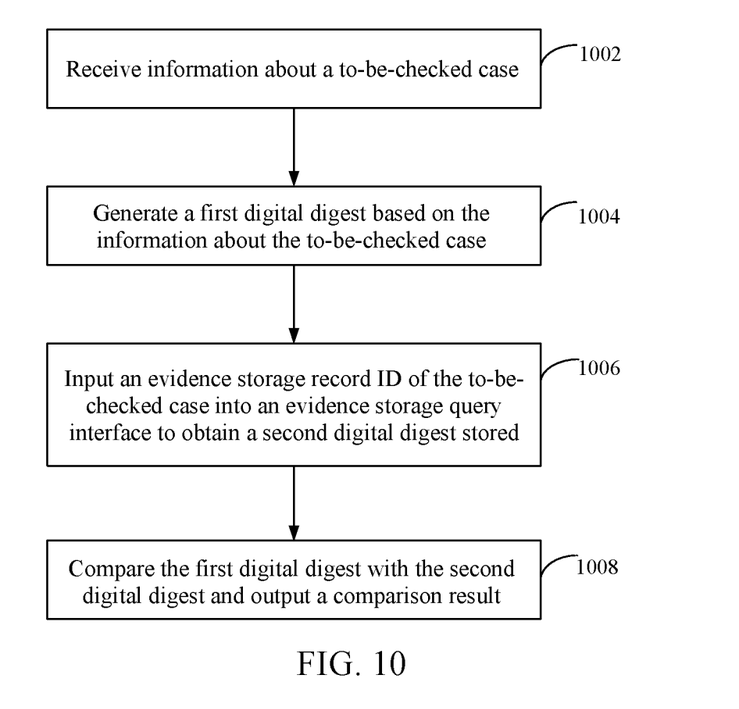
FIG. 10 is a flowchart of a cross-blockchain interaction method, according to an embodiment of this specification.

FIG. 10 is a flowchart of a cross-blockchain interaction method, according to an embodiment of this specification. The interaction method is applicable to an evidence storage server and includes steps 1002 to 1008.

Step 1002. Receiving information about a to-be-checked case.

In some embodiments, the information about the to-be-checked case may include content of a claim settlement case with claim settlement completed or content of a finished public welfare activity.

In one or more embodiments of this specification, if a user intends to verify whether case information is modified, the user may invoke a digital digest algorithm the same as that of an evidence storage client to process the content of the processed case to generate a first digital digest, and send a case information query request to the evidence storage server, where the query request carries an evidence storage record ID and the first digital digest.

Step 1004. Generating the first digital digest based on the information about the to-be-checked case.

In one or more embodiments of this specification, an MD5 algorithm is used as an example. According to the MD5 algorithm, the whole file is used as large text information to generate a unique MD5 information digest by using an irreversible character string transformation algorithm thereof. After receiving the information about the to-be-checked case, the information about the to-be-checked case is used as text information to generate the first digital digest by using the MD5 algorithm.

Step 1006. Inputting an evidence storage record ID of the to-be-checked case into an evidence query interface to obtain a second digital digest stored.

In one or more embodiments of this specification, the evidence storage server stores the second digital digest corresponding to the content of the case, and the user may obtain the second digital digest by inputting the evidence storage record ID into the evidence query interface.

Step 1008. Comparing the first digital digest with the second digital digest and outputting a comparison result.

In one or more embodiments of this specification, if the stored digital digest is the same as the digital digest submitted by the user, the returned result is that the information is not modified.

If the stored digital digest is different from the digital digest submitted by the user, the returned result is that the information is modified.

In one or more embodiments of this specification, all nodes on the judicial chain may provide a verification entrance. Information stored on the blockchain is public, but user identity information is strongly encrypted and can be accessed only with authorization of a data owner, thereby protecting data security and personal privacy. Transparent and tamper-resistant case information is implemented while user privacy is ensured, and a judicial effect is achieved for evidencing the case information. Similarly, a service provider proves itself by using the same method that, although the request client is controlled by the service provider, case information stored in the request client is not tampered with by the service provider after the evidence storage.

Figure 11:
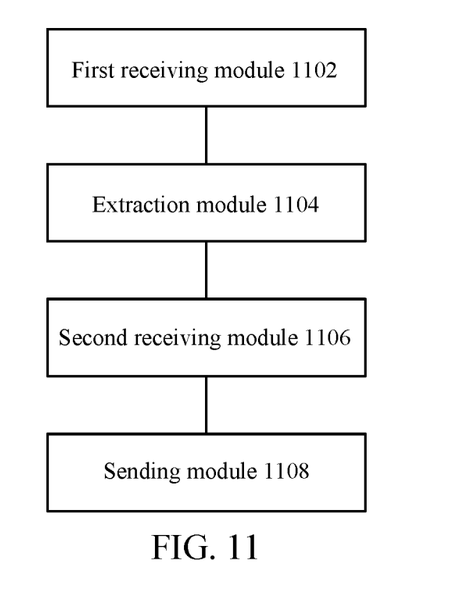
FIG. 11 is a schematic structural diagram of a cross-blockchain interaction apparatus, according to an embodiment of this specification.

An embodiment of this specification further provides a cross-blockchain interaction apparatus. As shown in FIG. 11, the interaction apparatus includes a first receiving module 1102, an extraction module 1104, a second receiving module 1106, and a sending module 1108.

The first receiving module 1102 is configured to receive an evidence storage request, where the evidence storage request carries a digital digest generated by processing content of a processed case.

In one or more embodiments of this specification, to-be-stored case information includes related information such as insurance policy information, user information, an audit conclusion, diagnosis and treatment information, and an inspection report. A specific form of the related information may include: 1) a word processing file; 2) a graphic processing file; 3) a database file; 4) a program file; and 5) a video, audio, or image file. The request client splices and integrates the information related to the case according to a preset rule and processes the integrated content of the case by using a digital digest algorithm to generate a digital digest.

The extraction module 1104 is configured to extract the digital digest, and send the digital digest to an evidence storage client for evidence storage.

The second receiving module 1106 is configured to obtain an evidence storage record ID returned by the evidence storage client, and return the evidence storage record ID, the digital digest, and the content of the case to an information storage node.

The sending module 1108 is configured to return the evidence storage record ID, the digital digest, and the content of the case to a request client.

The apparatus is applicable to different industries, such as the public service industry or the insurance industry. For a specific application manner, reference may be made to the descriptions of the system or method related parts in this specification, and details are not described herein again.

In one or more embodiments of this specification, information is stored jointly by a plurality of nodes distributed at different places, thereby representing a decentralization feature of blockchain nodes. In addition, each node records complete information, so that all the nodes may participate in supervision of transaction validity and also jointly attest to the transaction validity.

In some embodiments, the various modules of the interaction apparatus in FIG. 11 may be implemented as software instructions or a combination of software and hardware. For example, the interaction apparatus in FIG. 11 (or referred to as a system) may comprise one or more processors (e.g., CPU) and one or more non-transitory computer-readable storage memories coupled to the one or more processors and configured with instructions executable by the one or more processors to cause one or more components (e.g., the one or more processors) of the system to perform various steps and methods of the modules described above (e.g., with reference to the method embodiments). In some embodiments, the interaction apparatus in FIG. 11 may include a server, a mobile phone, a tablet computer, a PC, a laptop computer, or a combination of one or more of these computing devices.

Figure 12:
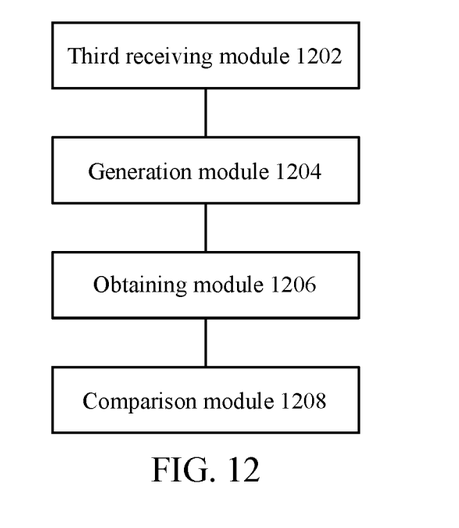
FIG. 12 is a schematic structural diagram of a cross-blockchain interaction apparatus, according to an embodiment of this specification.

An embodiment of this specification further provides a cross-blockchain interaction apparatus. As shown in FIG. 12, the interaction apparatus includes a third receiving module 1202, a generation module 1204, an obtaining module 1206, and a comparison module 1208.

The third receiving module 1202 is configured to receive information about a to-be-checked case.

In one or more embodiments of this specification, if a user intends to verify whether content of a claim settlement case is modified, the user may invoke the same digital digest algorithm to process the content of the processed case to generate a digital digest, and send a case information query request to an evidence storage server, where the query request carries an evidence storage record ID and the newly generated digital digest.

The generation module 1204 is configured to generate a first digital digest based on the information about the to-be-checked case.

The obtaining module 1206 is configured to input an evidence storage record ID of the to-be-checked case into an evidence query interface to obtain a second digital digest stored.

The comparison module 1208 is configured to compare the first digital digest with the second digital digest, and send a check result of the to-be-checked case to a request client.

The apparatus is applicable to different industries, such as the public service industry or the insurance industry. For a specific application manner, reference may be made to the descriptions of the system or method related parts in this specification, and details are not described herein again.

In some embodiments, the various modules of the interaction apparatus in FIG. 12 may be implemented as software instructions or a combination of software and hardware. For example, the interaction apparatus in FIG. 12 (or referred to as a system) may comprise one or more processors (e.g., CPU) and one or more non-transitory computer-readable storage memories coupled to the one or more processors and configured with instructions executable by the one or more processors to cause one or more components (e.g., the one or more processors) of the system to perform various steps and methods of the modules described above (e.g., with reference to the method embodiments). In some embodiments, the interaction apparatus in FIG. 12 may include a server, a mobile phone, a tablet computer, a PC, a laptop computer, or a combination of one or more of these computing devices.

In one or more embodiments of this specification, if the stored digital digest is the same as the digital digest submitted by the user, the returned result is that the information is not modified. If the stored digital digest is different from the digital digest submitted by the user, the returned result is that the information is modified.

In one or more embodiments of this specification, the system is open, except that private information of transaction parties is encrypted, data of the blockchain is public to everyone, and anyone may query for blockchain data and develop related applications through an open interface, so that the whole system information is highly transparent. Transaction information stored on the blockchain is public, but user identity information is strongly encrypted and can be accessed only with authorization of a data owner, thereby protecting data security and personal privacy. Transparent and tamper-resistant compensation information is implemented while user privacy is ensured, and a judicial effect is achieved for evidencing the compensation information.

An embodiment of this application further provides a computer device including a memory, a processor, and computer instructions stored on the memory and runnable on the processor, where when the processor executes the instructions, steps of the cross-blockchain interaction method described above are implemented. An embodiment of this specification further provides a computer-readable storage medium, storing computer instructions, where when the instructions are executed by a processor, steps of the cross-blockchain interaction method described above are implemented.

The foregoing describes an exemplary solution of a computer-readable storage medium according to the embodiments in this specification. The technical solution of the storage medium and the technical solution of the cross-blockchain interaction method belong to the same conception, and for detailed content of the technical solution of the storage medium that is not described in detail, reference may be made to the description of the technical solution of the foregoing cross-blockchain interaction method.

The computer instructions include computer program code. The computer program code may be in a source code form, an object code form, executable file or some intermediate forms, or the like. The computer-readable medium may include: any entity or apparatus that is capable of carrying the computer program code, a recording medium, a USB flash drive, a removable hard disk, a magnetic disk, an optical disc, a read-only memory (ROM), a random access memory (RAM), an electric carrier signal, a telecommunication signal and a software distribution medium, and the like. The content contained in the computer-readable medium may be appropriately increased or decreased according to the requirements of legislation and patent practice in jurisdictions. For example, in some jurisdictions, according to legislation and patent practice, the computer-readable medium does not include an electric carrier signal and a telecommunication signal.

For ease of description, the foregoing method embodiments are represented as a series of action combinations, but a person skilled in the art should know that this specification is not limited to the described order of the actions because some steps may be performed in another order or performed simultaneously according to this specification. In addition, a person skilled in the art should also appreciate that all the embodiments described in this specification are exemplary embodiments, and the related actions and modules are not necessarily mandatory to this specification.

In the foregoing embodiments, the description of each embodiment has respective focuses. For a part that is not described in detail in an embodiment, reference may be made to related descriptions in other embodiments.

The exemplary embodiments of this specification disclosed above are only used to help explain this application. The optional embodiments do not describe all the details, and are not intended to limit this application to the specific implementations described. Many modifications and changes may be made according to the content of this specification. These embodiments are selected and described in this specification for better explaining the principles and practical applications of this specification, so that a person skilled in the art can better understand and use this application. This application is subject to the claims and full scope and equivalents thereof.

What is claimed is:

1. A cross-blockchain interaction system, comprising:
a service consortium chain, a judicial chain, a request client, and an evidence storage server, wherein:
the request client is configured to obtain content of a case, generate a digital digest of the content, and send an evidence storage request to the evidence storage server, wherein the evidence storage request carries the digital digest;
the evidence storage server is configured to receive the evidence storage request, extract the digital digest, and send the digital digest to an evidence storage client;
the evidence storage client corresponds to a blockchain node of the judicial chain and is configured to receive the digital digest, store the digital digest to the judicial chain, and return an evidence storage record ID to the evidence storage server;
the evidence storage server is further configured to obtain the evidence storage record ID, and return the evidence storage record ID, the digital digest, and the content to an information storage node; and
the information storage node corresponds to a blockchain node of the service consortium chain, and is configured to receive and store the evidence storage record ID, the digital digest, and the content to the service consortium chain.

2. The cross-blockchain interaction system according to claim 1, wherein the service consortium chain and the judicial chain are different blockchains both coupled to the evidence storage server.

3. The cross-blockchain interaction system according to claim 1, wherein the service consortium chain comprises an insurance service consortium chain, and the case is a claim settlement case.

4. The cross-blockchain interaction system according to claim 1, wherein the service consortium chain comprises a public welfare consortium chain, and the case is a public welfare activity case.

5. The cross-blockchain interaction system according to claim 1, wherein the evidence storage server is further configured to return the evidence storage record ID, the digital digest, and the content to the request client.

6. The cross-blockchain interaction system according to claim 1, wherein the content of the case comprises user information and service-related information of the case.

7. The cross-blockchain interaction system according to claim 6, wherein the request client is further configured to: obtain information related to the case, and splice and integrate the information related to the case according to a preset rule of the request client to obtain the content.

8. The cross-blockchain interaction system according to claim 7, wherein the request client is further configured to: receive a check request for a to-be-checked case and forward the check request to the evidence storage server;
the evidence storage server is further configured to: receive information about the to-be-checked case; generate a first digital digest based on the information about the to-be-checked case; input an evidence storage record ID of the to-be-checked case into an evidence query interface to obtain a second digital digest; and compare the first digital digest with the second digital digest, output a check result of the to-be-checked case, and feed back the result to the request client; and
the request client is further configured to: receive and output the check result of the to-be-checked case.

9. The cross-blockchain interaction system according to claim 1, wherein the service consortium chain comprises a service-related device institution node, a service device of an Internet platform, a device of a regulator, and a service device of the request client; and
the judicial chain comprises a service device of a notary office, a service device of a court, and a service device of a judicial expertise center.

10. A cross-blockchain interaction method, comprising:
receiving, by an evidence storage server, an evidence storage request from a request client, wherein the evidence storage request carries a digital digest of content of a case;
extracting, by the evidence storage server, the digital digest, and sending, by the evidence storage server, the digital digest to an evidence storage client for storage to a judicial chain, wherein the evidence storage client corresponds to a blockchain node of the judicial chain and is configured to receive the digital digest, store the digital digest to the judicial chain, and return an evidence storage record ID to the evidence storage server; and
obtaining, by the evidence storage server, the evidence storage record ID returned by the evidence storage client, and returning, by the evidence storage server, the evidence storage record ID, the digital digest, and the content of the case to an information storage node for storage to a service consortium chain, wherein the information storage node corresponds to a blockchain node of the service consortium chain, and is configured to store the evidence storage record ID, the digital digest, and the content to the service consortium chain.

11. The cross-blockchain interaction method according to claim 10, wherein the service consortium chain and the judicial chain are different blockchains both coupled to the evidence storage server.

12. The cross-blockchain interaction method according to claim 10, wherein the content of the case comprises: content of a completed claim settlement case or content of a finished public welfare activity case.

13. The cross-blockchain interaction method according to claim 10, further comprising:
returning the evidence storage record ID, the digital digest, and the content to a request client.

14. The cross-blockchain interaction method according to claim 10, further comprising:
receiving, by the evidence storage server, information about a to-be-checked case;
generating, by the evidence storage server, a first digital digest based on the information about the to-be-checked case;
inputting, by the evidence storage server, an evidence storage record ID of the to-be-checked case into an evidence query interface to obtain a second digital digest; and
comparing, by the evidence storage server, the first digital digest with the second digital digest and outputting, by the evidence storage server, a comparison result.

15. The cross-blockchain interaction method according to claim 10, wherein the service consortium chain comprises a service-related device institution node, a service device of an Internet platform, a device of a regulator, and a service device of the request client; and the judicial chain comprises a service device of a notary office, a service device of a court, and a service device of a judicial expertise center.

16. One or more non-transitory computer-readable storage media storing instructions executable by one or more processors, wherein execution of the instructions causes the one or more processors to perform operations comprising:
receiving an evidence storage request from a request client, wherein the evidence storage request carries a digital digest of content of a case;
extracting the digital digest, and sending the digital digest to an evidence storage client for storage to a judicial chain, wherein the evidence storage client corresponds to a blockchain node of the judicial chain and is configured to receive the digital digest, store the digital digest to the judicial chain, and return an evidence storage record ID; and
obtaining the evidence storage record ID returned by the evidence storage client, and returning the evidence storage record ID, the digital digest, and the content of the case to an information storage node for storage to a service consortium chain, wherein the information storage node corresponds to a blockchain node of the service consortium chain, and is configured to store the evidence storage record ID, the digital digest, and the content to the service consortium chain.

17. The one or more non-transitory computer-readable storage media according to claim 16, wherein the service consortium chain and the judicial chain are different blockchains both coupled to an evidence storage server that comprises the one or more non-transitory computer-readable storage media.

18. The one or more non-transitory computer-readable storage media according to claim 16, wherein the content of the case comprises: content of a completed claim settlement case or content of a finished public welfare activity case.

19. The one or more non-transitory computer-readable storage media according to claim 16, wherein the operations further comprise:
returning the evidence storage record ID, the digital digest, and the content to a request client.

20. The one or more non-transitory computer-readable storage media according to claim 16, wherein the operations further comprise:
receiving information about a to-be-checked case;
generating a first digital digest based on the information about the to-be-checked case;
inputting an evidence storage record ID of the to-be-checked case into an evidence query interface to obtain a second digital digest; and
comparing the first digital digest with the second digital digest and outputting a comparison result.

* * * * *